United States Patent
Gambino

(10) Patent No.: US 6,339,796 B1
(45) Date of Patent: Jan. 15, 2002

(54) SYSTEM FOR LOGICAL CONNECTION RESYNCHRONIZATION

(75) Inventor: Mark R. Gambino, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,959

(22) Filed: Oct. 29, 1998

(51) Int. Cl.7 .................................................. G06F 11/07
(52) U.S. Cl. ........................................ 709/248; 714/12
(58) Field of Search ......................... 709/27, 248, 249, 709/228, 400, 200; 714/4, 6, 11, 12, 13, 775, 2, 746; 386/95; 370/509, 503, 511, 513, 394, 324; 713/400; 375/557

(56) References Cited

U.S. PATENT DOCUMENTS

| | | | |
|---|---|---|---|
| 4,422,171 A | * 12/1983 | Wortley et al. | 714/748 |
| 4,926,414 A | * 5/1990 | Baratz et al. | 370/225 |
| 5,021,949 A | * 6/1991 | Morten et al. | 709/231 |
| 5,084,816 A | * 1/1992 | Boese et al. | 714/4 |
| 5,084,877 A | * 1/1992 | Netravali et al. | 714/48 |
| 5,212,789 A | * 5/1993 | Rago | 707/8 |
| 5,235,595 A | * 8/1993 | O'Dowd | 370/392 |
| 5,265,103 A | * 11/1993 | Brightwell | 714/748 |
| 5,506,955 A | * 4/1996 | Chen et al. | 714/26 |
| 5,517,622 A | * 5/1996 | Ivanoff et al. | 709/232 |
| 5,621,721 A | * 4/1997 | Vatuone | 370/329 |
| 5,692,178 A | * 11/1997 | Shaughnessy | 707/8 |
| 5,894,547 A | * 4/1999 | Baskey | 714/12 |
| 5,943,374 A | * 8/1999 | Kokuryo et al. | 375/354 |
| 6,006,268 A | * 12/1999 | Coile et al. | 709/227 |
| 6,085,248 A | * 7/2000 | Sambamurthy et al. | 709/229 |
| 6,134,237 A | * 10/2000 | Brailean et al. | 370/394 |
| 6,151,314 A | * 11/2000 | Rauhala | 370/350 |
| 6,230,283 B1 | * 5/2001 | Gambino | 714/12 |

OTHER PUBLICATIONS

IBM Technical Disclosure Bulletin, "Multibus Synchronization for RAID-3 Data distribution", vol. 35, No. 5, (Oct. 1992), pp. 21–24.*

IBM Technical Disclosure Bulletin, "Recovery Management in Transaction Processing System", vol. 39, No. 4, (Apr. 1996), pp. 27–29.*

* cited by examiner

Primary Examiner—Mark H. Rinehart
Assistant Examiner—Bunjo B Jaroenchonwanit
(74) Attorney, Agent, or Firm—Lily Neff, Esq.; Kevin P. Radigan, Esq.; Heslin Rothenberg Farley & Mesiti P.C.

(57) ABSTRACT

A technique is provided for resynchronizing message traffic in a communication network following network component failure. A failing component, upon restart, retrieves stored control information including a SYNC number and byte sequence number (BSN) from external memory. The SYNC number is then incremented by a predetermined amount to obtain a new SYNC number, with the predetermined amount being sufficient to ensure that the new SYNC number comprises a current SYNC number. Assuming that the failure occurs at a first data processing system in the network, a status request message is sent from the first data processing system to a second data processing system across the logical connection. The status request includes the new SYNC number, and the BSN read from the external memory. The first data processing system waits for a response message to its status request message. The response message contains a BSN of a next piece of data that the second data processing system is expecting. This information is then used to update the logical connection control information at the first data processing system, thereby completing resynchronization.

13 Claims, 3 Drawing Sheets

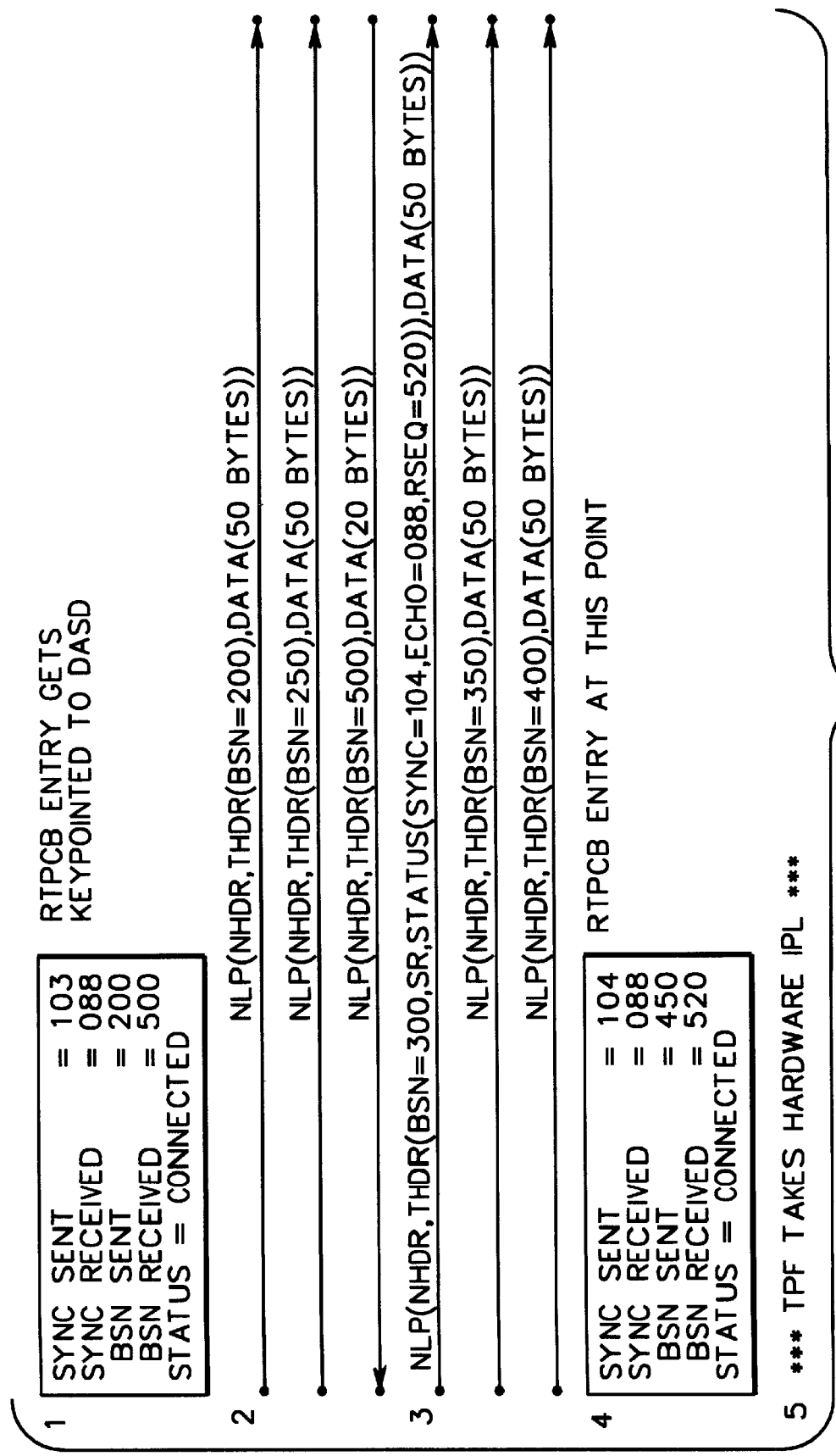

SYSTEM FOR LOGICAL CONNECTION RESYNCHRONIZATION

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"METHOD FOR LOGICAL CONNECTION RESYNCHRONIZATION," by Mark R. Gambino, Ser. No. 09/181,753, and "LOGICAL CONNECTION RESYNCHRONIZATION," by Mark R. Gambino, Ser. No. 09/181,705,

TECHNICAL FIELD

The present invention relates in general to the operation of computerized data communication networks, and more particularly, to the recovery of communication network operations after a failure of one of the network components.

BACKGROUND OF THE INVENTION

Computer data communication networks are used to transmit information between geographically dispersed computers and between user devices such as computer terminals or workstations and host computer applications. A variety of communication architectures exist. Two such data communication architectures are the IBM System Network Architecture (SNA) and the International Standards Organization's (ISO) Open System Interconnection (OSI) architecture. One embodiment of IBM's System Network Architecture is described in a co-pending, commonly assigned U.S. patent application, Ser. No. 08/245,053, entitled "Virtual Route Resynchronization", the entirety of which is hereby incorporated herein by reference.

High Performance Routing (HPR) is a recent enhancement to the IBM Systems Network Architecture. HPR uses rapid transport protocol (RTP), and the logical connection between two HPR-capable nodes is called an RTP connection. The ends of the connection are referred to as the RTP endpoints, while any intermediate nodes along the RTP connection route are called the automatic network routing (ANR) nodes. Error recovery on an RTP connection is done end-to-end rather than node-to-node, meaning that only the RTP endpoints are involved.

Many end-user sessions can flow on a given RTP connection. Also, data messages sent on an RTP connection can get lost in the network or might arrive out of order at the destination RTP endpoint. Each message that flows on an RTP connection is assigned a byte sequence number (BSN) which enables the destination node to determine when data is lost or arrives out of order. It is critical that the origin RTP endpoint fill in the correct BSN when sending out a message, otherwise the RTP connection will fail causing all the end-user sessions to also fail.

Because of the need to maintain the sequence of messages between the data host and other components, communications with a failing unit can only be restarted if the sequence number information is known or if the entire communications network is reinitialized. Reinitialization of a large network is highly undesirable because of the considerable time required. This lost time can be costly to a business that is dependent upon transaction processing for its operations. Various schemes have been proposed for retaining sequence information so that the network can be restarted without reinitialization. However, data host failure may occur unpredictably and may not afford an opportunity to save the necessary sequencing information. In these situations, a network reinitialization is required. There is therefore a need to have a system or method for resynchronizing data communications without reinitializing the network.

The present invention addresses the technical problems of recovering synchronization information lost during a network component failure. It is also directed to the problem of resynchronizing message traffic between adjacent communication components following a component failure.

DISCLOSURE OF THE INVENTION

Briefly summarized, this invention comprises in one aspect a system for resynchronizing message traffic between a first data processing system and a second data processing system connected by a data communications network. The message traffic travels over a logical connection linking the first and second data processing systems, and each message in the message traffic includes a SYNC number and a byte sequence number. A recipient of each message tests to determine whether the message has a next expected byte sequence number and discards any byte sequence number older than the next expected byte sequence number. The system includes means for retrieving, after the failure of the first data processing system, a stored SYNC number and byte sequence number (BSN) from external memory, as well as means for incrementing the SYNC number by a predetermined amount to obtain a new SYNC number, the predetermined amount being sufficient to ensure that the new SYNC number comprises a current SYNC number. Means for sending a status request message from the first data processing system to the second data processing system are also provided wherein the status request includes the new SYNC number, and the BSN read from the external memory. The first data processing system includes means for waiting for receipt of a response message to the status request message, wherein the response message will contain a BSN of a next piece of data that the second data processing system is expecting. The system also includes means for updating logical connection control information at the first data processing system with the BSN value for the next piece of data expected by the second data processing system upon receipt of the response message.

To restate, provided herein is a technique for rapidly resynchronizing and recovering virtual network routes without reinitializing the communications network upon startup from a component failure. Further, the process described herein achieves resynchronization of message traffic quickly with low system processing overhead. The solution is described herein with reference to IBM's Transation Processing Facility (TPF) operating system; however, is applicable to various systems as will be understood by those in the data communications art.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 2 illustrates storage of a rapid transport protocol control block in accordance with the present invention and sample message traffic prior to a system failure;

BEST MODE FOR CARRYING OUT THE INVENTION

The following description of a preferred embodiment of the present invention is presented in terms of IBM System Network Architecture (SNA). However, it should be understood by data communications practitioners that the concepts disclosed herein are applicable to any Open Systems Interconnection (OSI) model or to any other similar network architecture. The use of SNA terms and descriptions is not meant to limit the scope of the present invention as defined by the claims appended hereto.

Figure 1:
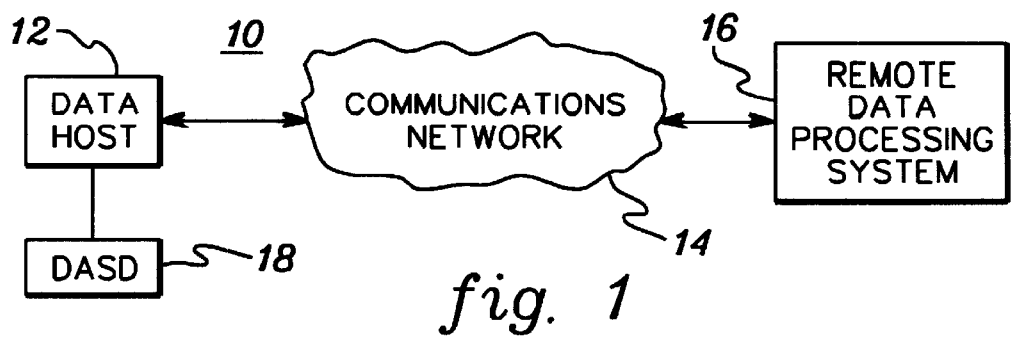
FIG. 1 is a block diagram of a data communications network to employ logical connection resynchronization in accordance with the present invention.

One embodiment of a data communications network, generally denoted 10, to implement resynchronization processing in accordance with this invention is depicted in FIG. 1. As an example, network 10 may use the IBM Transaction Processing Facility (TPF) operating system to support transaction processing in, for instance, a bank or airline application. Application processing occurs in a first data processing system, e.g., host processor 12, also referred to herein as the "data host". The host processor can be one of a number of computer processors such as IBM's 390 system. Communications from processor 12 are routed through a communications network 14 to one of a plurality of remote data processing systems 16. Each remote data processing system could comprise any one of another host computer, a computer terminal, a workstation, etc. Data host 12 is also connected to an external memory 18, such as DASD, for use as described herein below.

As will be understood by those in the data communications art, a session is created between data host 12 and remote processing system 16 which requires data to flow therebetween. This data flow occurs across a virtual or logical connection established within communications network 14. The logical connection essentially acts as a pipeline for messages between the data host and the remote terminal.

The data communication architecture requires that some control be exercised over the messages passing between the data host and the remote system. Errors in communication or interference introduced on the communication lines may corrupt messages or cause the loss of messages between units. Network integrity requires that the communication over the virtual route be monitored to ensure that no messages are lost. The SNA architecture controls message integrity over a logical connection by the sending node assigning sequence numbers to each message and by verifying at the recipient that each received message has a proper sequence number.

In practice, the SNA network may comprise one or more data hosts coupled through thousands of Rapid Transport Protocol (RTP) connections to a large number of remote systems. The failure of the data host, or another component of the network, can cause the entire communications network to cease operation. Because of the need to maintain the sequence of messages between the data host and the other components, communications within the failing unit can only be restarted if the sequence number information is known or if the entire communications network is reinitialized. Since reinitialization is considered unacceptable because of the down time, a technique is required by which RTP connection sequence numbers can be resynchronized after the failure, e.g., of a data host. In theory, the technique presented herein can be used by any RTP endpoint, but is particularly important for a data host that has thousands of end-user sessions. All the RTP connections will be broken once a data host comes back up after failure if the correct byte sequence numbers (BSNs) for the logical connections are not known by the data host. Breaking these logical connections and restarting them is again highly undesirable in a transaction processing oriented environment because of the considerable time required to accomplish reinitialization.

Certain information about an RTP connection is substantially static once the logical connection is established. This information includes the token that identifies the specific RTP connection, and the route that describes a path through the communications network between the two RTP endpoints, e.g., data host 12 and remote system 16 of FIG. 1. Because this information remains constant, the input/output overhead is negligible for safe-storing the information to external memory, such as DASD 18. Other information about an RTP connection is quite dynamic. For example, the byte sequence number (BSN) to assign to out-bound messages can be incremented hundreds of times per second. Safe-storing each current BSN is not possible due to the rate at which the BSN changes and the I/O overhead involved. The solution presented herein is to safe-store the RTP connection dynamic information periodically, for example, once every thirty or sixty seconds, so that fairly recent values are available if necessary, i.e., for recovery after a failure. When the data host fails, information in main storage at the data host is lost, including the RTP dynamic information such as BSN. Thus, in accordance with this invention, when the data host comes back up, the safe-stored RTP connection information is read in from external memory, i.e., DASD. This tells the data host what RTP connections are active, and in addition provides fairly recent logical connection information, such as BSN values.

Before further discussing an RTP connection resynchronization process in accordance with this invention, the contents and certain properties of RTP messages are reviewed. A message on an RTP connection is called a "network layer packet" (NLP) which contains three parts; namely, a network header (NHDR), a transport header (THDR), and DATA. The NHDR is not important in the present discussion. The THDR contains control information, including the BSN. Information in the THDR is always processed immediately. The DATA field contains application data that is passed to/from an end user. If information in the data field arrives out of order, the receiving node puts it back in order before the data is processed. If a node receives an NLP that contains duplicate BSN, i.e., a BSN that has already been received, the data portion of that NLP is discarded but the control information in the THDR is processed.

There is a numerical field in the THDR called "SYNC" that is used as a sequence number to identify new versions of old control information. The SYNC number is only updated when state change information flows; that is, it is not updated on every control message. If a node receives an NLP whose SYNC number is equal to or higher than the previously received SYNC number, the control information in the THDR of the NLP is processed; otherwise, the control information is discarded.

Another field in the THDR is called "ECHO". When a node sends an NLP, it puts the most recently received SYNC number it received in the ECHO field of the NLP being sent out. At any time, a node can send an NLP asking for status from the remote RTP endpoint. In the THDR of the reply NLP will be the BSN of the next message that the remote RTP endpoint is expecting to receive. Further, an NLP can be sent that contains control information only.

When the data host comes back up after a failure and reads in the RTP connection information from DASD, it knows which RTP connections are active, but does not know the current BSN. The problem is to determine from the RTP endpoint of each virtual connection what the correct BSN is for that connection. To ask, the data host has to send an NLP. If the data host were to send an NLP containing an old SYNC number, the control information would simply be discarded by the remote end. If the data host were to send an NLP containing a BSN higher than what is expected by the remote end, the remote end will think that data is missing.

One embodiment of an RTP connection resynchronization process in accordance with this invention can be used to keep RTP connections active across a hardware initial program load (IPL) of the TPF system. After a hardware IPL, the file copy of the SNA tables, including a rapid transport protocol control block (RTPCB) table, is reloaded from file. The RTPCB table on file is likely to be several seconds old. Therefore the TPF system does not know the current input or output byte sequence number (BSN) values for an RTP connection. The current SYNC and ECHO values for an RTP connection are not known either. The following provides an example of the problems:

1. An RTP connection is active. Time-initiated keypointing files out (i.e., saves to external memory) the RTPCB entry, which contains the following values:
   SYNC sent=103
   SYNC received=85
   Next BSN to send=200
   Next expected BSN to receive=500.
2. Messages are sent and received on the RTP connection. The RTPCB entry now contains the following values:
   SYNC sent=105
   SYNC received=88
   Next BSN to send=450
   Next expected BSN to receive=622.
3. A hardware IPL of the TPF system is done. SNA restart reloads the SNA tables from file. The RTPCB entry after the IPL contains:
   SYNC sent=103
   SYNC received=85
   Next BSN to send=200
   Next expected BSN to receive=500.

All of the values in the RTPCB entry are old, which can lead to different problems:

1. If the TPF system sends an NLP containing a STATUS segment, the remote RTP endpoint discards the control information in that NLP because the SYNC number (103) in the NLP is old. The current SYNC number is now 105. The ECHO number (85) in the STATUS segment is also old (it should be 88).
2. If the remote RTP endpoint sends an NLP containing a STATUS segment, the TPF system would accept the control information because the SYNC number (88) in the NLP is equal to or greater than the last SYNC number received (85). The problem is that the STATUS segment would acknowledge receiving messages up to BSN value 450, but the TPF system thinks it has not yet sent bytes 200–449. This would be treated as a protocol violation and cause the RTP connection to be taken down.
3. If the TPF system sends an NLP with BSN=200 and a length of 300 bytes, the first 250 bytes of data would be discarded (bytes 200–449) and the last 50 bytes would be treated as the next expected message. Because these 50 bytes are really the middle of a message, they would not have the correct start-of-message header settings. This will cause the remote RTP endpoint to break the RTP connection because of a protocol violation.
4. If the remote RTP endpoint sends an NLP containing data, the BSN in the NLP will be 622. Because the TPF system is expecting data starting with BSN=500, the TPF system queues the NLP and asks the remote RTP endpoint to retransmit bytes 500–621. Because the TPF system already acknowledged receipt of bytes 500–621 before the IPL, the remote RTP endpoint does not have that data anymore and will break the RTP connection.

The RTP connection resynchronization process prevents all of these problems. The first step after reloading the RTPCB table from file is to increase the SYNC number value of the RTP connection by a large amount to make sure it is current. Using the previous example, the SYNC number in the file copy of the RTPCB entry is 85, but the real current SYNC number is 88. As explained further below, the RTP connection resynchronization process presented herein will increase the SYNC number in the RTP entry by a large amount (for example, by 100), so that the new value (185) is guaranteed to be greater than the current SYNC number. This way, control information sent by the TPF system will be accepted.

The next step is to set a flag in the RTPCB entry to indicate that when the first NLP is received after the IPL, assume that the BSN in that NLP is the BSN of the next expected message.

Figure 3:
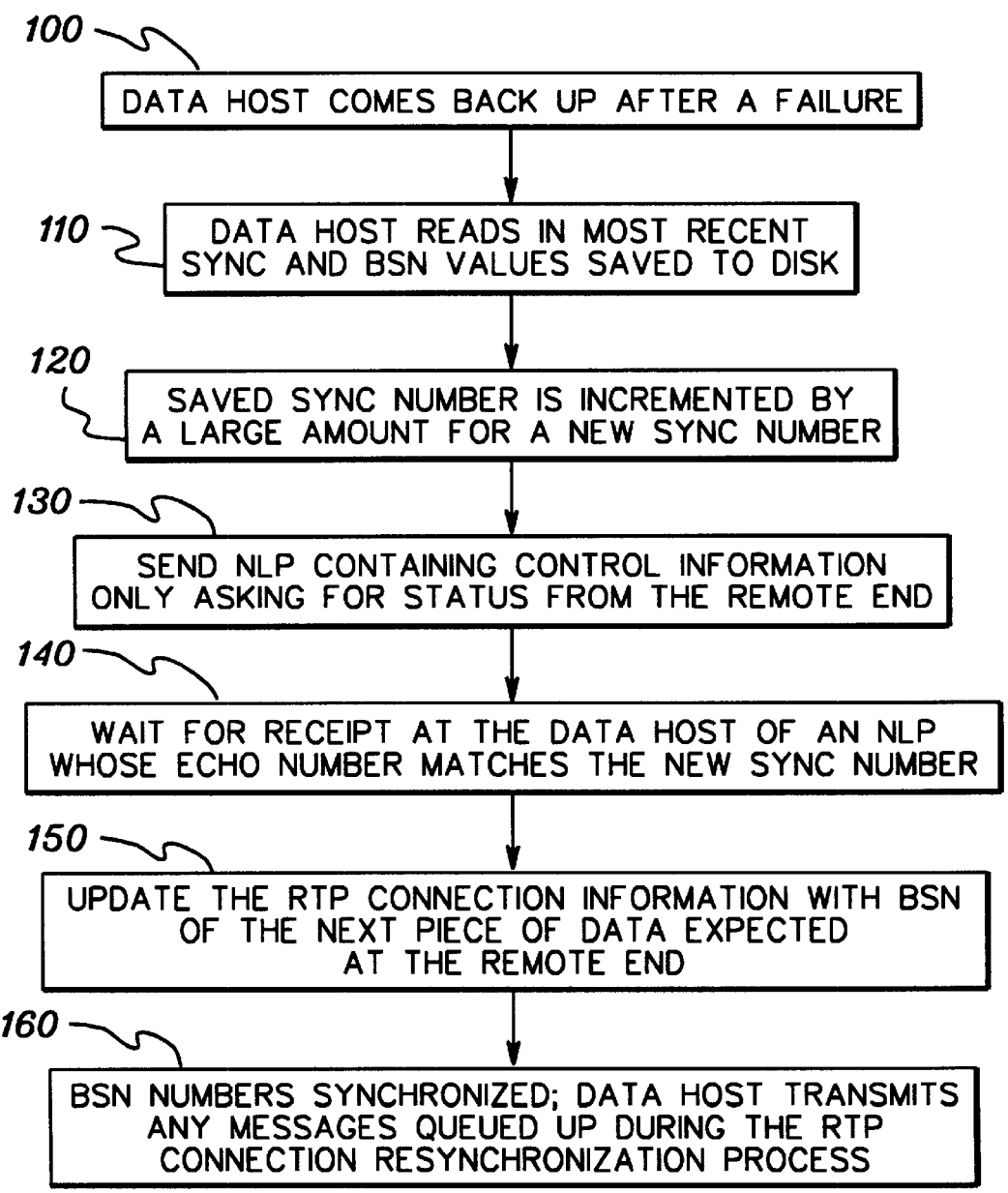
FIG. 3 is a flowchart of one embodiment for resynchronizing message traffic in accordance with the present invention.

The final step of the RTP connection resynchronization process is to have the TPF system send out an HPR control message (an NLP with no data) to ask the remote RTP endpoint the BSN of the next message it is expecting. Until the response to that control message is received, the TPF system cannot send any data on this RTP connection. When the response is received, the next expected BSN value is copied into the output BSN field in the RTPCB entry and data traffic continues. The process is explained further below in connection with FIGS. 2–4.

FIG. 2 depicts one example of events leading up to a hardware IPL of the TPF system. In item 1, a rapid transport protocol control block (RTPCB) is keypointed to external memory. The RTP connection is active at this point and the SNA time-initiated keypointing is assumed to file out an RTPCB entry with the values shown. The "STATUS" field indicates that the logical connection is in normal state with data flowing back and forth between the data host and remote system. By way of example, item 2 shows two 50-byte messages being sent by the data host to the remote system and one 20-byte message being received at the data host from the remote system. Since the next BSN to be received at the data host is 500, the received message in item 2 is processed. Next, the TPF system sends three more 50-byte messages, the first of which asks for a STATUS reply. The "SR" field in the THDR is a Status Request bit asking for status from the remote end on messages received and the next BSN expected. The STATUS section is control information that includes a SYNC number to identify the control information for the remote end, an ECHO number identifying the last SYNC number received at the other end (which is a technique for identifying whether the remote side has received your control information) and an RSEQ number representative of a received sequence number, i.e., the next sequence number that the TPF system is expecting from the other end. 50 bytes of data is assumed to be transmitted with each message. Item 4 illustrates the RTPCB entry at this point allowing for the messages transmitted in item 2 and item 3. Item 5 notes that a hardware IPL of the TPS system next occurs. Before discussing resynchronization for this specific example of FIG. 2, a general resynchronization process in accordance with the present invention is first discussed with reference to FIG. 3.

Upon a data host coming back up after a failure 100, the host will read in, e.g., the most recent SYNC and BSN values saved to external memory prior to the failure. Again, the goal of the present invention is to maintain connections that were active prior to the failure and retrieve the correct synchronization numbers for the connections. The data stored to external memory will tell which connections were active and provide relatively current information on the data transmitted.

The saved SYNC number retrieved from external memory is incremented by a large amount to obtain a new SYNC number 120. The objective is to send control information that will be accepted by the other side. To do this, the SYNC number must be considered current by the remote system. Thus the SYNC number is incremented by a large amount predetermined to be sufficient to ensure that the number will be current. For example, it might be known that in an implementation storing control blocks to external memory every 60 seconds, the SYNC number would never be incremented by 100 or more. Thus, to ensure that the SYNC number is current after the failure, 100 is added to the retrieved SYNC number to obtain a new SYNC number.

At the same time, the Status Request (SR) flag is set to indicate that resynchronization processing is occurring, i.e., that the data host is in RESYNC state. Any data messages received from applications at the host will be queued during the resynchronization state. Thus, as far as the applications know, the logical connection is valid.

After the SYNC number has been incremented and the connection has been placed in RESYNC state, an NLP is sent containing control information only, i.e., no data, asking for status from the remote end 130. Included within this message are the new SYNC number and the BSN read from the external memory. The purpose of the status request message is to ask the remote end what is the next message (i.e., BSN) it is expecting. Again, if the SYNC number is greater than a previously received SYNC number, then the message is considered current and it will process the control information within the message.

The data host then waits for a reply to the STATUS request message 140. In particular, the data host looks for an NLP with an ECHO number which matches the new SYNC number forwarded with the status request message. When the two are equal, the data host knows that the remote system is responding to the status request message. This NLP received from the remote system will contain the BSN of the next piece of data that the remote end is expecting. The RTP connection information is the updated with the BSN of the next piece of data expected at the remote end 150, and the BSN numbers have been successfully synchronized. The data host thus turns off the RESYNC state flag and transmits any messages that have been queued up during the RTP connection resynchronization process 160.

Figure 4:
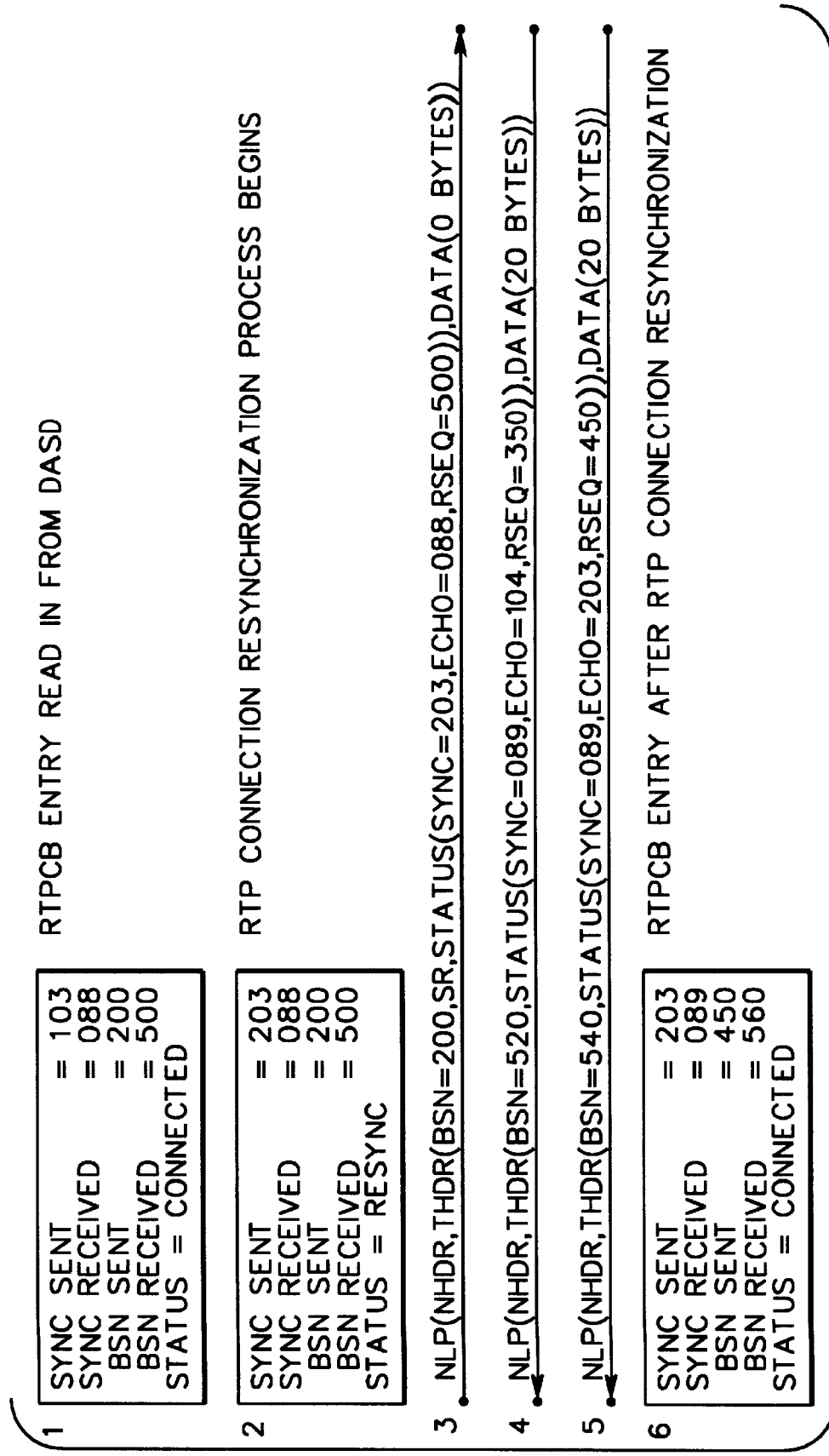
FIG. 4 illustrates a continuation of the example of FIG. 2 using the resynchronization processing of FIG. 3 to establish proper synchronization on the logical connection.

FIG. 4 is a continuation of the example of FIG. 2 wherein resynchronization processing in accordance with this invention is employed. Steps 1 through 6 of FIG. 4 are assumed to follow steps 1 through 5 of FIG. 2. First, the RTPCB table is reloaded from the external memory after the IPL during network restart. The values of the RTPCB entry shown are old.

In step 2, the RTP connection resynchronization process begins by increasing the SYNC number by a large amount, e.g., from 103 to 203, and placing the logical connection in RESYNC state.

When the TPF system is cycled up, an NLP is sent as shown in step 3 asking for a STATUS reply. Again, this NLP will contain no user data, and will have the new SYNC number and the most recently saved BSN.

The TPF system receives an NLP containing 20 bytes of data and a STATUS segment in step 4. Because this is the first NLP received after the failure, the BSN received field in the RTPCB entry is set to the BSN value of this NLP (520). The data message is processed normally. However, the ECHO number (104) in the STATUS segment does not match the current SYNC number (203). Therefore, the RTP connection resynchronization process continues. The STATUS segment in this NLP is the reply to the status request sent out just before the IPL, i.e., reference step 3 of FIG. 2.

In step 5 of FIG. 4, another NLP is received containing a STATUS segment. This time the ECHO number(203) matches the current SYNC number, and therefore, this is the reply to the status request sent out by the RTP connection resynchronization process. The RSEQ value in the STATUS segment indicates that the next expected message that the remote RTP endpoint is waiting for starts with a BSN value of 450. The TPF system sets its output BSN (BSN SENT) field to 450 and places the connection back in CONNECTED state. Step 6 depicts the RTPCB entry after RTP connection resynchronization in accordance with this invention. At this point, RTP connection resynchronization is successfully completed and outbound data traffic continues.

Note that the example presented above shows that the first STATUS segment received after the IPL does not necessarily contain the latest information. The RSEQ value of the first STATUS segment was 350, but NLPs with BSN values 350–449 were already sent before the IPL. The RTP connection resynchronization process must send its own status request after the failure and wait for a reply to that status request in order to determine the correct RSEQ value.

Those skilled in the art will note from the above discussion that the present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A system for resynchronizing message traffic between a first data processing system and a second data processing system connected by a data communications network, said message traffic traveling over a logical connection linking said first and second data processing systems, where each message in said message traffic includes a SYNC number and a byte sequence number, and wherein a recipient of each said message tests to determine whether the message has a next expected byte sequence number and discards any byte sequence number older than the next expected byte sequence number, said system comprising:

means for retrieving, upon startup after a failure of said first data processing system, a stored SYNC number and byte sequence number (BSN) from external memory;

means for incrementing said SYNC number by a predetermined amount to obtain a new SYNC number, said predetermined amount being sufficient to ensure said new SYNC number comprises a current SYNC number;

means for sending a status request message from said first data processing system to said second data processing system, said status request including said new SYNC number, and said BSN read from said external memory;

means for receiving at the first data processing system a response message to said status request message, wherein said response message contains a BSN of a next piece of data that said second data processing system is expecting; and means for updating logical connection control information at said first data processing system with said BSN value for said next piece of data expected by said second data processing system.

2. The system of claim 1, further comprising means for placing said logical connection in a RESYNC state prior to sending of said status request message, wherein during said RESYNC state messages to be sent from said first data processing system to said second data processing system are queued.

3. The system of claim 2, further comprising means for removing said logical connection from said RESYNC state after said receiving of said response message, and for transmitting to said second data processing system messages queued at said first data processing system during said RESYNC state.

4. The system of claim 1, wherein said means for sending said status request message comprises means for sending control information only within said status request message from said first data processing system to said second data processing system, and wherein said new SYNC number is sufficient to ensure that said control information in said status request message is processed by said second data processing system.

5. The system of claim 1, wherein said first data processing system comprises a data host, said logical connection comprises a rapid transport protocol (RTP) connection, and said messages in said message traffic each comprise network layer packets (NLPs).

6. The system of claim 5, wherein said data host comprises a transaction processing operating system.

7. The system of claim 6, wherein said failure comprises a hardware failure at said data host.

8. The system of claim 5, further comprising means for periodically storing logical connection control information to said external memory.

9. The system of claim 8, wherein said logical connection control information comprises a rapid transport protocol control block (RTPCB).

10. The system of claim 9, wherein said external memory comprises a direct access storage device (DASD).

11. The system of claim 1, wherein said means for receiving comprises means for receiving at the first data processing system a response message having an ECHO number that matches said new SYNC number of said status request message.

12. A system for resynchronizing message traffic between a first data processing system and a second data processing system connected by a data communications network, said message traffic traveling over a logical connection linking said first and second data processing systems, where each message in said message traffic includes a SYNC number and a byte sequence number, and wherein a recipient of each said message tests to determine whether the message has a next expected byte sequence number and discards any byte sequence number older than the next expected byte sequence number, said system comprising:

said first data processing system being adapted to:
(i) retrieve, after startup from a failure of said first data processing system, a stored SYNC number and byte sequence number (BSN) from external memory;
(ii) increment said SYNC number by a predetermined amount to obtain a new SYNC number, said predetermined amount being sufficient to ensure said new SYNC number comprises a current SYNC number;
(iii) send a status request message from said first data processing system to said second data processing system, said status request including said new SYNC number, and said BSN read from said external memory;
(iv) receive from the second data processing system a response message to said status request message, wherein said response message contains a BSN of a next piece of data that said second data processing system is expecting; and
(v) update logical connection control information at said first data processing system with said BSN value for said next piece of data expected by said second data processing system.

13. A system for resynchronizing message traffic comprising:

a first data processing system and a second data processing system connected by a data communications network, said message traffic traveling over a logical connection linking said first and second data processing systems, where each message in said message traffic includes a byte sequence number, and wherein a recipient of each said message tests to determine whether the message has a next expected byte sequence number and discards any byte sequence number older than the next expected byte sequence number;

external memory coupled to said first data processing system;

said first data processing system being adapted to periodically store current information about said logical connection in said external memory, said current information including identifying information on said logical connection and a route through said communication network between said first data processing system and said second data processing system, said current information further including a SYNC number and a byte sequence number (BSN);

means for retrieving, after startup from a failure of said first data processing system, a most recently stored SYNC number and byte sequence number (BSN) from said external memory;

means for incrementing said SYNC number by a predetermined amount to obtain a new SYNC number, said predetermined amount being sufficient to ensure said new SYNC number comprises a current SYNC number;

means for sending a status request message from said first data processing system to said second data processing system, said status request including said new SYNC number, and said BSN read from said external memory;

means for receiving at the first data processing system a response message whose ECHO number matches said new SYNC number of said status request message, wherein said response message contains a BSN of a next piece of data that said second data processing system is expecting; and means for updating logical connection information at said first data processing system with said BSN value for said next piece of data expected by said second data processing system.

* * * * *